United States Patent
Sherman et al.

(10) Patent No.: US 7,769,874 B2
(45) Date of Patent: Aug. 3, 2010

(54) HIGHLY SCALABLE, FAULT-TOLERANT FILE TRANSPORT USING VECTOR-EXCHANGE

(75) Inventors: Alexander Sherman, Sharon, MA (US); Andrew D. Berkheimer, Boston, MA (US); Philip A. Lisiecki, Quincy, MA (US); William E. Weihl, San Francisco, CA (US); Joel M. Wein, Flushing, NY (US)

(73) Assignee: Akamai Technologies, Inc., Cambridge, MA (US)

( * ) Notice: Subject to any disclaimer, the term of this patent is extended or adjusted under 35 U.S.C. 154(b) by 1067 days.

(21) Appl. No.: 10/783,328

(22) Filed: Feb. 20, 2004

(65) Prior Publication Data

US 2005/0187981 A1 Aug. 25, 2005

(51) Int. Cl.
*G06F 15/16* (2006.01)
*G06F 17/30* (2006.01)
(52) U.S. Cl. ................. 709/229; 709/219; 707/E17.107
(58) Field of Classification Search ................. 709/229, 709/217–219, 203, 205, 225, 227, 223; 707/E17.107, 707/204; 719/316; 718/104
See application file for complete search history.

(56) References Cited

U.S. PATENT DOCUMENTS

| | | | | |
|---|---|---|---|---|
| 5,263,165 A | * | 11/1993 | Janis | 711/163 |
| 6,643,641 B1 | * | 11/2003 | Snyder | 707/4 |
| 6,662,198 B2 | * | 12/2003 | Satyanarayanan et al. | 707/204 |
| 7,058,696 B1 | * | 6/2006 | Phillips et al. | 709/217 |
| 2001/0042139 A1 | * | 11/2001 | Jeffords et al. | 709/316 |

* cited by examiner

*Primary Examiner*—Peling A Shaw
(74) *Attorney, Agent, or Firm*—David H. Judson

(57) ABSTRACT

A file transport mechanism according to the invention is responsible for accepting, storing and distributing files, such as configuration or control files, to a large number of field machines. The mechanism is comprised of a set of servers that accept, store and maintain submitted files. The file transport mechanism implements a distributed agreement protocol based on "vector exchange." A vector exchange is a knowledge-based algorithm that works by passing around to potential participants a commitment bit vector. A participant that observes a quorum of commit bits in a vector assumes agreement. Servers use vector exchange to achieve consensus on file submissions. Once a server learns of an agreement, it persistently marks (in a local data store) the request as "agreed." Once the submission is agreed, the server can stage the new file for download.

17 Claims, 2 Drawing Sheets

HIGHLY SCALABLE, FAULT-TOLERANT FILE TRANSPORT USING VECTOR-EXCHANGE

BACKGROUND OF THE INVENTION

1. Technical Field

The present invention relates generally to distributed computer networks and the management of such networks.

2. Description of the Related Art

It is known in the art to deliver digital content (e.g., HTTP content, streaming media and applications) using an Internet content delivery network (CDN). A CDN is a network of geographically distributed content delivery nodes that are arranged for efficient delivery of content on behalf of third party content providers. Typically, a CDN is implemented as a combination of a content delivery infrastructure, a DNS-based request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure typically consists of on-demand or push-based mechanisms that move content provider content from the origin server to the surrogates. An effective CDN serves frequently accessed content from a surrogate that is optimal for a given requesting client. In a typical CDN, a single service provider operates the request-routing mechanism, the surrogates, and the content distributors. In addition, that service provider establishes business relationships with content publishers and acts on behalf of their origin server sites to provide a distributed delivery system.

A content delivery network such as described above may also include a file transport mechanism that is used to accept, store and distribute files across the distributed network. A representative file is a "configuration" file that the service provider desires to deliver to each of the surrogates. That configuration file may include, for example, object-specific metadata that determines how the surrogate should handle a request for an object being served by the CDN from that server. A file transport mechanism of this type typically comprises a set of servers, including at least one control server that acts as an entry point for the mechanism, and one or more staging servers such as HTTP servers running Apache. Using a secure portal, an input file (e.g., a set of customer-specific metadata) is provided to the control server by the CDN service provider or some other permitted entity (e.g., the customer), and that file is then periodically delivered to the staging servers along with other files that have been input to the mechanism. The staging servers then deliver the file to update processes that typically execute on the CDN content servers themselves.

The above-described file transport mechanism generally works well but presents a potential single point of failure if the control server that serves as the entry point fails, or if communications between the control server and the staging servers is disrupted. In particular, in these known schemes, the control server and the set of staging servers represent a "top-down" or hierarchical configuration wherein the file to be transported moves from a single entry point and out to more and more locations. Moreover, such systems are constrained by the requirement that file entry take place in what is essentially a central location, as it is not possible for the service provider or other permitted user to enter files for delivery from multiple locations. This reduces the level of availability of the transport mechanism, especially if the mechanism is distributed across different computer networks.

The present invention addresses these and other associated problems of the prior art.

BRIEF SUMMARY OF THE INVENTION

It is an object of the invention to provide a highly scalable and fault-tolerant system for file transport in a distributed computer network.

It is another primary object of the invention to provide a transport mechanism that allows fast, reliable and effective transmission of files in such a network.

It is another object of the invention to provide an improved system for accepting, storing and distributing files such as configuration files, control files, and the like to a distributed set of servers that accept, store and maintain submitted files.

It is another object of the invention to provide a file transport mechanism wherein any of a set of multiple servers can accept files. By enabling multiple entry points, the present invention eliminate the single point-of-failure inherent in top-down schemes wherein a single machine is used as an entry point into the system.

A file transport mechanism according to the invention is responsible for accepting, storing and distributing files, such as configuration or control files, to a large number of field machines. The mechanism is comprised of a set of servers that accept, store and maintain submitted files, and optionally a set of staging servers (or "stagers"). A separate subscription service (e.g., an updater process) is available on field machines for file updates, typically from the stagers. The file transport mechanism preferably implements a distributed agreement protocol based on "vector exchange." A vector exchange is a knowledge-based algorithm that works by passing around to potential participants a commitment bit vector. A participant that observes a quorum (e.g., a majority) of commit bits in a vector assumes agreement. Generally, a "quorum" is any required subset of all servers that are capable of accepting the file. Servers use vector exchange to achieve consensus on file submissions. Once a server learns of an agreement, it persistently marks (in a local data store) the request as "agreed." Once the submission is agreed, the server can stage the new file for download (e.g., by staging servers, or by updater processes), and in the case of the accepting server, reply to the submitter that the request is successful.

An illustrative embodiment is implemented in a system comprising a set of distributed servers. Each server has the capability of accepting a file submission. A method of accepting a request begins when a submitter (e.g., a client machine) initiates a request to submit a file to one of the servers. The server at which the request is received then determines its connectivity to other servers in the set. This may be an active check (e.g., by testing for liveness), or the determination may be based on connectivity information already present in the server. Once the server identifies its connectivity (and such connectivity typically should be to a quorum), the server encodes given information about the file into a temporary identifier. The given information includes, for example, the filename, a timestamp, an identifier for the server at which the request is received, and a random string. The server then pushes the file and its associated temporary identifier to each of the other servers to which it has connectivity. Thereafter, if the server succeeds in pushing the file to a quorum, the server generates a knowledge vector (e.g., a data array) and initiates a vector exchange to each of the other servers to which it has connectivity. When a given server receives the knowledge vector, it makes a determination as to whether the knowledge vector identifies the given server as having knowledge of the file. If the given server has knowledge of the file, the given server modifies the knowledge vector to reflect this knowledge, and then outputs it to all of the machines to which it has connectivity. As a result of the vector exchange, the servers fill the bits of the knowledge vector as they learn about it. When a given server makes a determination that a quorum of the servers knows about the file, the file is deemed "accepted" for submission. Typically, a "quorum" is, by default, a simple majority, although the value may be a settable parameter. Once the file has been accepted, each server that has the file removes the temporary identifier and stores the file persistently in its local file system. The file is then available to be delivered to the updater processes running on the field machines, either directly or through the staging servers.

The vector exchange guarantees that, if a given server "accepts" a submission, a quorum (e.g., a majority) of servers to which the given server has connectivity have agreed on it.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF AN EMBODIMENT

Figure 1:
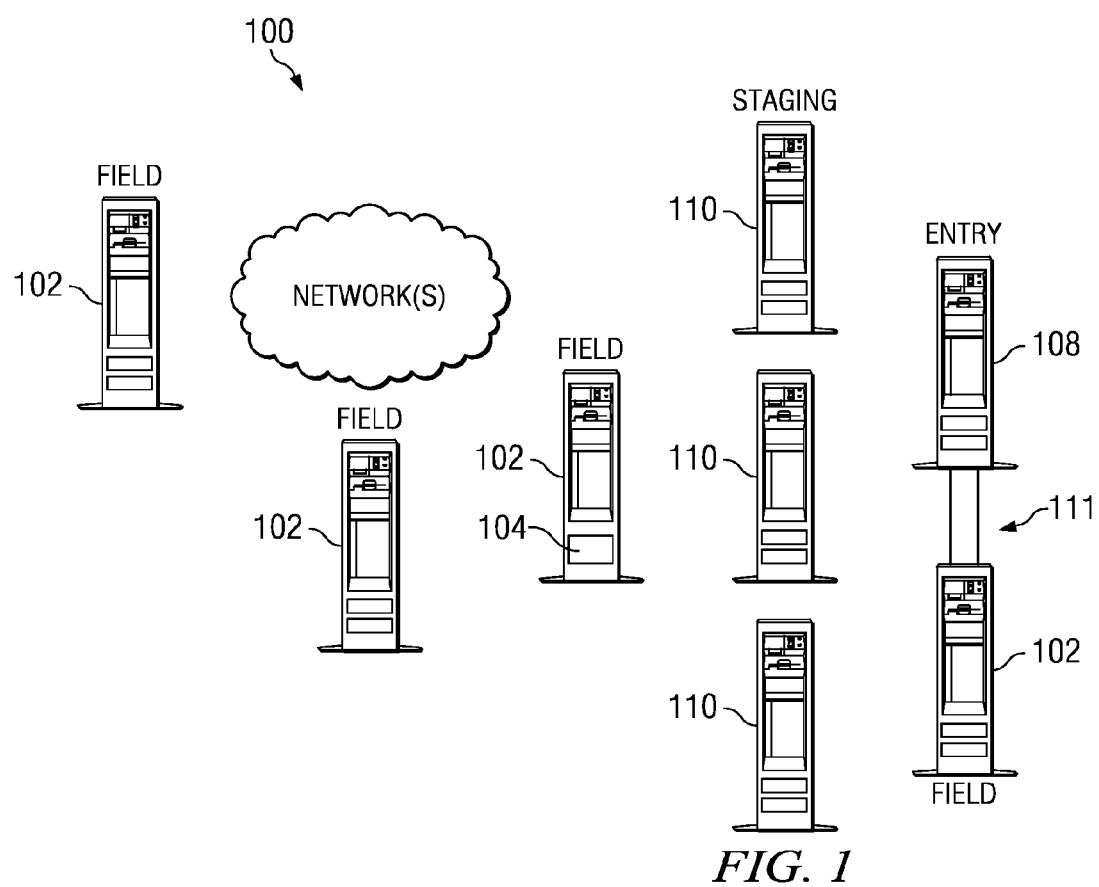
FIG. 1 is a block diagram of a distributed computing environment in which the file transport mechanism system of the present invention is implemented.

As seen in FIG. 1, a distributed computing environment 100 in which the file transport system of the invention may be implemented includes a set of field machines 102 that facilitate or provide a given operation, such as Internet content delivery. How a particular field machine is used is not particularly relevant to the present invention, as the invention is directed generally to how files are transported to the field machines, as opposed to the particular type of data in the file or the function of the particular machine that receives the file. Generalizing, a field machine 102 is any machine or "host" installable by a deployment routine and identifiable, e.g., through information residing in a network configuration file. More generally, the present invention is useful in any distributed networking environment in which it is required to install files on field machines that are interdependent and/or that provide redundancy to each other. A typical field machine 102 is a server built on commodity hardware, and having an operating system (e.g., Linux-based, Windows-based, or the like) and given software applications as needed to carry out the function of the machine in the distributed network. Thus, for example, in a content delivery network, the field machine may be an edge server that has an object cache in which participating content provider content is cached and served to requesting end user client browsers that are mapped to the edge server by the CDN DNS mechanism. In one embodiment, a given field machine may also include an updater process 104 that interfaces with the file transport mechanism, as will be described below. The updater process need not run on a field machine.

An illustrative file transport mechanism of the present invention comprises a set of entry servers 108 that may be located across different networks, together with a set of staging servers 110. Staging servers typically are HTTP servers running conventional software such as Apache, and they may or may not participate in the vector-exchange and index merging protocols described in more detail below. Each of the entry servers 108 should have the capability of communicating with another of the entry servers (and, optionally the staging servers) over a secure communication channel. More generally, a pair of entry servers 108 may be considered endpoints of an optimized and secure TCP connection. In a preferred embodiment, optimized and secure I/O between a pair of such endpoints is implemented using a secure tunnel function 111. This function allows any two servers to multiplex all their communications, typically over a few SSL connections, and it may includes a set of extendable C++ classes for high level protocol specification. The C++ classes may be extended to specify high-level parameters of the protocol. In an illustrative embodiment, a single secure, encrypted TCP connection is opened and maintained between the endpoints and is able to multiplex efficiently all communications that take place over this connection. Thus, files pushes can be multiplexed between a pair of servers over this single secure tunnel. This tunnel can also be used to push "agreement" messages between a pair of servers to implement a distributed agreement protocol, which is now described.

Distributed agreement according to the present invention ensures that a given entry server accepts a user's request (such as a file push request) only if a "quorum" of servers agree on the request. It is assumed that the invention is implemented in a system that has a set of distributed servers that accept file submissions and, optionally, a set of stagers that stage the files. A quorum is a subset of the set of distributed servers required for request acceptance and agreement. The value of a quorum preferably is parameterized, but typically defaults to a simple majority. With this technique, if a server stages data for download, there is a guarantee that a quorum of servers has agreed on the data.

Figure 2:
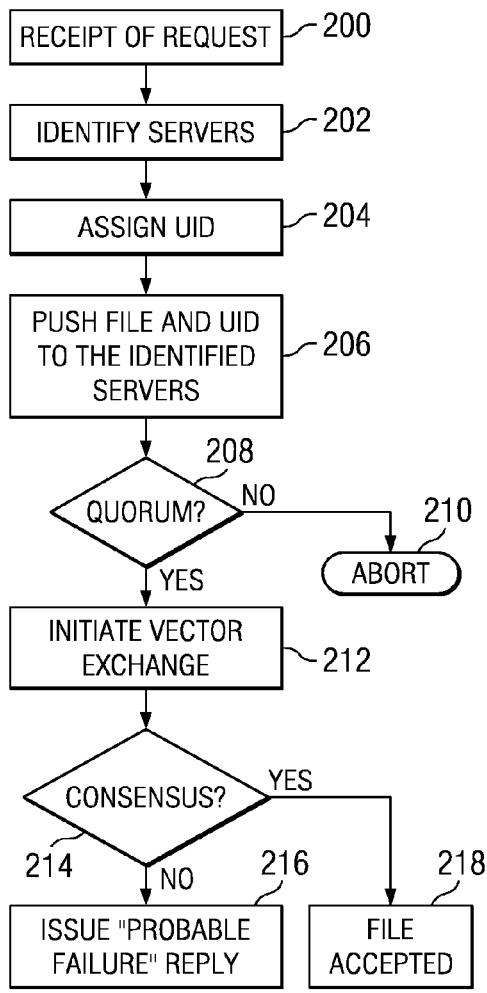
FIG. 2 is a process description of the distributed agreement and data replication protocol of the present invention.
Figure 3:
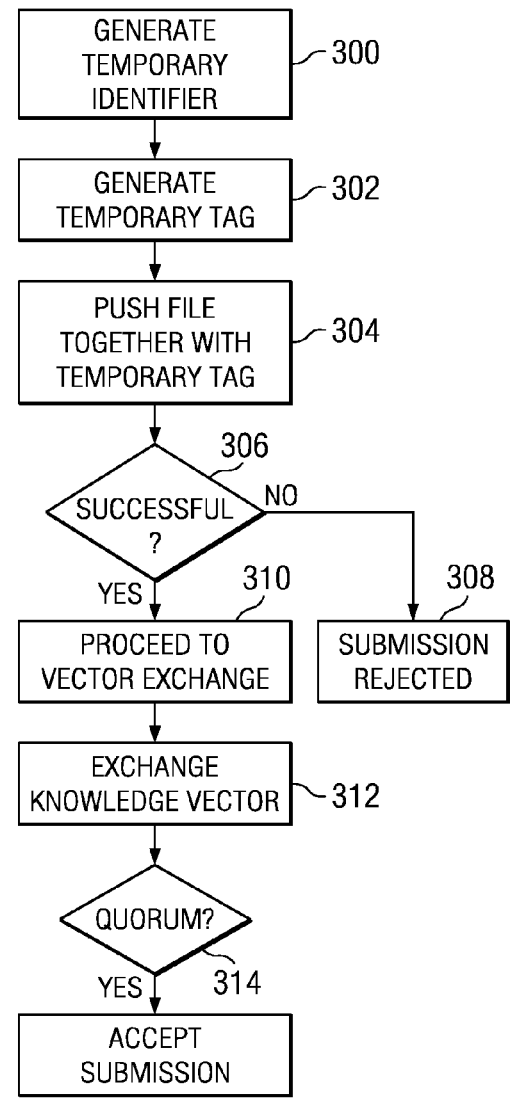
FIG. 3 is a process description of an illustrative vector exchange protocol.

As illustrated in the flowchart of FIG. 2, the distributed agreement protocol begins at step 200 with the receipt of a request from a permitted user. Access to a server to perform a file push typically requires a secure link, such as an extranet application. Programmatic access may be used as well. According to the protocol, a given server "accepts" a request only if it has persistent connectivity to a quorum of servers, the file push succeeds, and the vector exchange reaches a consensus, as will be seen. This process works as follows. At step 202, the server at which the submission request is received identifies those servers to which it has connectivity. Step 202 may be active or passive. An active determination may be based on any convenient technique, such as ICMP. The method then continues at step 204. At this step, the server (at which the submission request is received) assigns a unique identifier (UID) to the data. At step 206, the server pushes the file (and its UID) to the other servers to which it has connectivity. At step 208, a test is made to determine if the server is able to push to a quorum within a given timeout period. If not, the request is aborted. This is step 210. If the server is able to push to a quorum within the given timeout period, the protocol continues at step 212 to an agreement phase.

In step 212, the server initiates a vector exchange agreement for the data. A test is then made at step 214 to determine if the server is able to reach a consensus within a given timeout period. If not, a "probable failure" reply is returned. This is step 216. If, however, the server is able to reach a consensus within the given timeout period, each server that learns of the consensus by quorum marks the data persistently as being "agreed." This is step 218; when this step is reached, the file is "accepted." At this point, any server that knows of the agreement can stage the data to one or more of the staging servers (or directly to the updater processes), and the server at which the submission was made may return (to the requesting client) a successful reply, usually as soon as there is a time window during which a quorum of servers can talk to each other.

One of ordinary skill will appreciate that if there is a quorum of servers that have connectivity, the vector exchange will succeed. Indeed, a consensus will eventually occur even in the case of a probable failure, although it might not succeed in time to provide a timely reply to the submitter.

The following are additional details of a preferred implementation of the distributed agreement protocol that is used in the file transport mechanism to provide fault-tolerance. As described in this embodiment, the file transport mechanism achieves high fault-tolerance through the use of a vector exchange scheme (VE), an algorithm based on knowledge vectors. As noted above, with VE, a quorum of the accepting servers agree on a version of the accepted file before acknowledging (or accepting) the submission. Vector exchange is a consensus scheme that uses knowledge vectors as follows.

When a server sees a submission it generates a temporary identifier that preferably includes the filename, the timestamp, and the accepting server name. This is step 300. This identifier is unique for all file transport submissions, as no file can be submitted twice on the same clock second by the same server. Thus, in a representative example, the string test.txt.1.9999.A refers to a case in which the file test.txt has been submitted to zone 1 (an arbitrary construct in this example) at timestamp 9999 to server A). At step 302, server A also assigns a temporary tag to this file, such as: test.txt.1.9999.A.03485, where the string 03458 is a temporary random string. Server A then pushes the file together with this temporary tag to servers (preferably including itself) to which it has determined it has connectivity. This is step 304. At step 306, a test is performed. In particular, if server A is unable to complete the file push step within a given timeout, it rejects the submission. This is indicated at step 308. Preferably, the timeout value is parameterized and is dependent on the size of the file being pushed. Otherwise, server A proceeds to VE. This is indicated at step 310.

VE generates a knowledge vector for the file. At step 312, this vector is then exchanged among the servers to determine whether a consensus can be reached. In a preferred embodiment, the servers fill the bits of the vector as they learn about it. Thus, for example, server A is initialized as follows:

test.txt1.9999.A.03485 A:1 B:0 C:0

This string means that server A knows about the file, while servers B and C do not. When server B receives the vector, server B fills its bit and passes on the vector to its peers, e.g.:

test.txt1.9999.A.03485 A:1 B:1 C:0

Once server A receives the vector back (which is indicated by a positive outcome of the test at step 314), it realizes that a quorum (e.g., a majority) of servers, in this case, servers A and B, know about the file, because the bits are filled and server A is also able to accept this submission (as it sent the vector in the first instance). Prior to passing a vector to its peers, a server (that receives the vector) first stores its changes to the vector persistently on its local disk. Thus, if the server is restarted, it reads in the stored vectors and picks up the VE algorithm from that point.

The vector exchange guarantees is that if the mechanism accepts a submission, then a quorum (e.g., a majority) of servers have agreed on it. Thus, there are no false positives. It is possible, however, for a false negative to occur, i.e., where a submitting client times out and the system still goes through and accepts the file, or if the client gets a rejection message because the vector exchange takes too long. The probability of a false negative, however, is small, as preferably each VE phase is preceded by a file push phase, and only if the file is pushed to a majority successfully does the VE phase begin. One of ordinary skill will appreciate that file pushing is expensive, which is why it is a better indicator of whether the VE phase is likely to succeed. Once the VE phase completes, the file with the temporary tag preferably is renamed to its permanent name and is moved to a permanent location on disk. It may then be safely provided to the staging servers in a push or pull manner, and from the staging servers to the updater processes running on the field machines. Alternatively, an updater process may obtain the file directly from one of the servers in the quorum, i.e., without use of a stager.

In an illustrative embodiment, the above-described functionality is implemented in software executable in a processor. Preferably, a server executing the inventive method includes a data structure that identifies (1) whether the server has the file together with a temporary identifier in its local database, and (2) with respect to that temporary identifier, whether a quorum has reached agreement. If both bits in the data structure are valid, the file is ready to be staged.

If two different submissions for the same file occur, the system selects for staging the one with the greater unique identifier, where the unique identifier is sorted by timestamp, and then, if necessary, by server name. Thus, if a file with the same name is submitted to the system from two sources, the system will be ordered correctly, as the file submitted later will be staged.

As described generally above, the file transport mechanism is responsible for accepting, storing and distributing various files, such as configuration or control files, to a large number of field machines. The mechanism is comprised of a set of servers that accept, store and maintain submitted files. A separate subscription service (e.g., an updater process) is available on field machines for file updates. The file transport mechanism preferably implements two protocols, a distributed agreement and data replication scheme based on "vector exchange." A vector exchange is a knowledge-based algorithm that works by passing around a commitment bit vector. A participant that observes a quorum of commit bits in a vector assumes agreement. Servers use vector exchange to achieve consensus on file submissions. Once a server learns of an agreement it persistently marks (in a local data store) the request as "agreed." Once the submission is agreed (and typically all that participate have to mark the submission in this way), the server can stage the new file for download (e.g., by staging servers, or by updater processes), and in the case of the accepting server, reply with "success" to the submitter.

The present invention provides significant advantages. There is no longer a single point of failure, and multiple entry points may be used to accept file submissions. This ensures high availability of the mechanism and greater fault tolerance because only a quorum of servers has to be operational for the system to accept file submissions. Without distributed agreement, a server might acknowledge a request and fail before replicating the file. In such case, the user might believe that the request has been accepted and acted upon. Without distributed agreement, the server might receive a file and propagate it to some but not all of the staging servers and then fail. The staging servers would then disagree about the file version. A similar situation would occur where different servers that receive different versions of the file at about the same time each succeeds in propagating it to a partial set of the staging servers. All of the problems are avoided using the distributed agreement scheme of the present invention.

Preferably, servers operating the inventive technique are closely synchronized, e.g., using NTP. Preferably, a given pair of the servers are not permitted to communicate if their system clocks are too far apart (e.g., greater than 30 seconds).

Variants

One of ordinary skill will recognize that distributed agreement may be used for actions other than file submission. Thus, for example, the above-described technique may be used to facilitate a file deletion across a distributed system.

Having described the invention, what we claim is as follows.

The invention claimed is:

1. A method operative in a system in which a set of distributed servers accept file submissions, comprising:
in response to receipt of a submission of a file at a given server, communicating the file from the given server to other servers in the set to which the given server has connectivity;
if within a first timeout period the file has been successfully communicated from the given server to the other servers in the set, accepting the submission at the given server only if within a second timeout period a given subset of the other servers reach an agreement to the submission, where the agreement is determined using a data exchange protocol that includes sub-steps as follows:
passing a bit vector from a first server to a second server, the bit vector including a first indication that the first server has knowledge of the file;
upon receipt of the bit vector at the second server, having the second server modify the bit vector to include, together with the first indication, a second indication that the second server also has knowledge of the file;
having the second server pass the bit vector, which includes the first and second indications, to one or more other servers in the given subset; and
upon a given state being reached, as indicated by at least the first and second indications in the bit vector, determining that the agreement has been reached within the second timeout period; and
upon acceptance of the submission, staging the file for subsequent transport.

2. The method as described in claim 1 wherein the given subset of the set of servers is a quorum.

3. The method as described in claim 2 wherein the quorum is a majority.

4. A method operative in a system comprising a set of distributed servers, wherein each server has the capability of accepting a file submission, comprising:
in response to receipt at a given server of a request to submit a file, having the given server determine its connectivity to other servers of the set;
encoding given information about the file into a temporary identifier;
having the given server push the file and its associated temporary identifier to each of the other servers to which the given server has connectivity;
if the file has been successfully pushed to each of the other servers within a first timeout period, having the given server initiate a data exchange protocol to each of the other servers to which the given server has connectivity, where the data exchange protocol includes sub-steps as follows:
passing a knowledge bit vector among the given server and the other servers;
having each server that receives the knowledge bit vector modify the knowledge bit vector to indicate that server's knowledge of the file;
based on the knowledge bit vector as modified, determining whether a quorum of the servers have reached a given state within a second timeout period; and
if the quorum of servers reach the given state within the second timeout period, accepting the file for submission.

5. The method as described in claim 4 wherein the temporary identifier comprises given information, the given information selected from a set of information that includes a filename, a timestamp, an identifier for the server at which the request is received, and a random string.

6. The method as described in claim 4 wherein the quorum is a majority.

7. The method as described in claim 4 wherein the quorum is a given subset of the set of servers.

8. The method as described in claim 4 further including:
at each server of the quorum and after the file is accepted:
removing the temporary identifier; and
storing the file persistently in a local file system.

9. The method as described in claim 8 further including staging the file for subsequent delivery.

10. The method as described in claim 4 further including having the given server issue a reply to a requesting client that the file submission was successful.

11. The method as described in claim 4 wherein the first timeout period is a function of a size of the file.

12. The method as described in claim 1 wherein the first timeout period is a function of a size of the file.

13. The method as described in claim 1 wherein the given server communicates with at least one other server in the set over a secure link.

14. The method as described in claim 4 wherein the given server communicates with at least one other server in the set over a secure link.

15. The method as described in claim 1 wherein the file is one of: a configuration file, and a control file.

16. The method described in claim 1 wherein each of the servers in the set accepts file submissions.

17. The method described in claim 4 wherein each of the servers in the set accepts file submissions.

* * * * *